Aug. 23, 1938.  L. R. JOHNSON  2,127,689
TRAILER HITCH
Filed Feb. 25, 1937  2 Sheets-Sheet 1
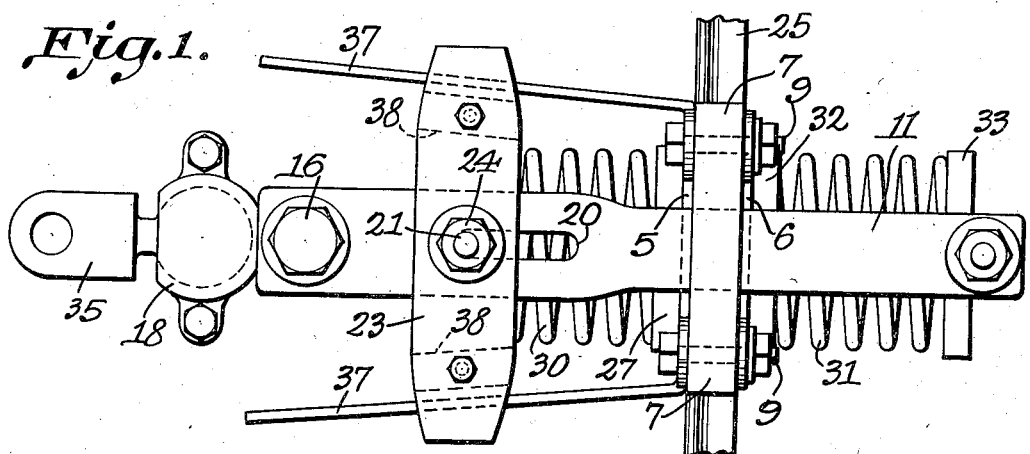
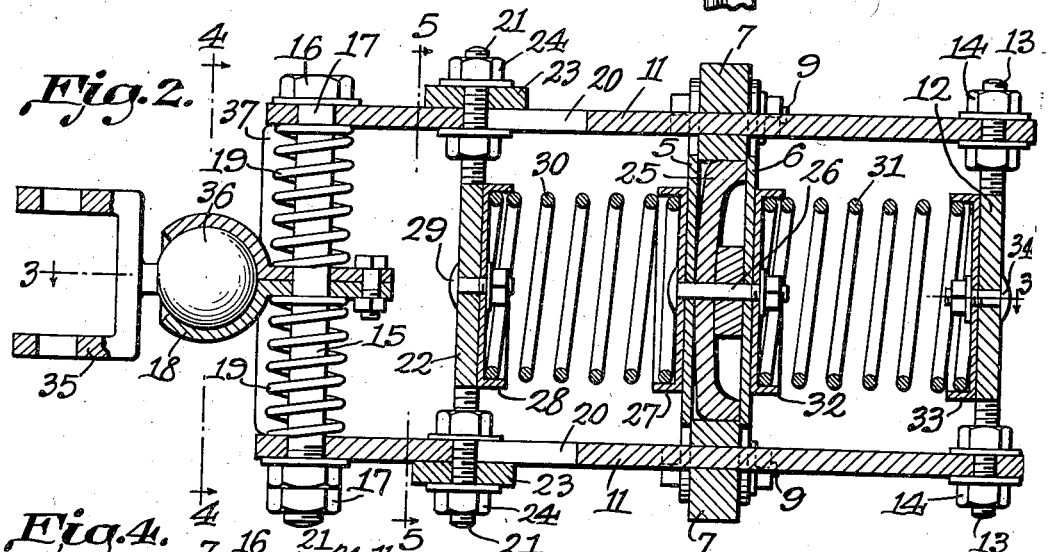
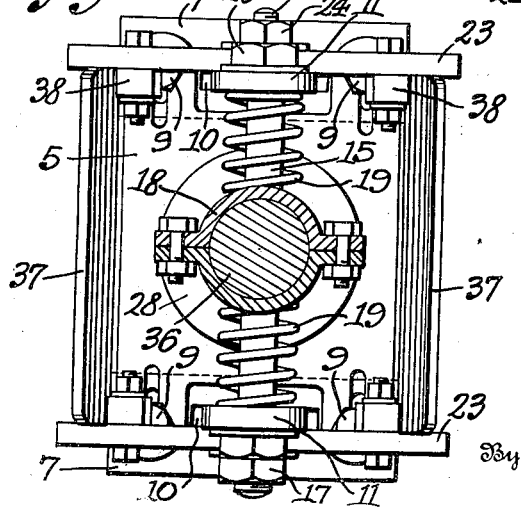
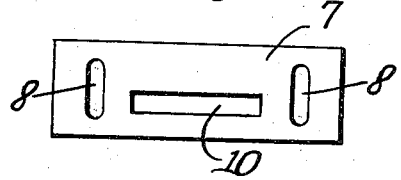
Inventor
L. R. Johnson
By C. A. Snow & Co.
Attorneys Aug. 23, 1938.       L. R. JOHNSON       2,127,689
TRAILER HITCH
Filed Feb. 25, 1937       2 Sheets-Sheet 2
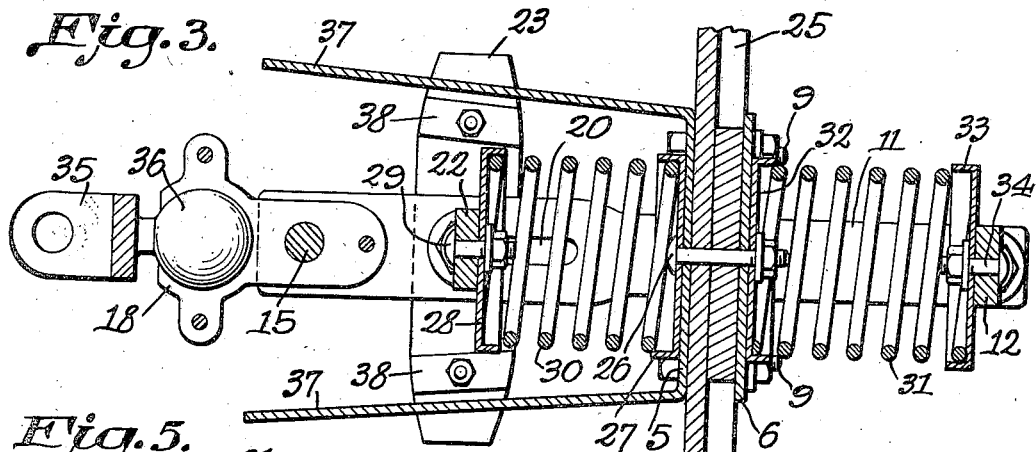
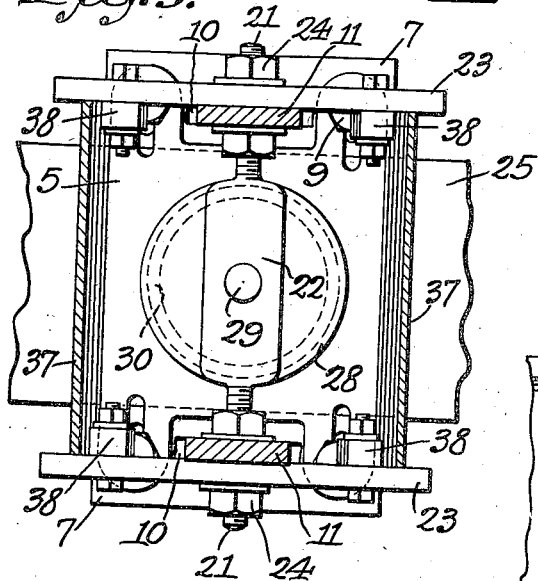
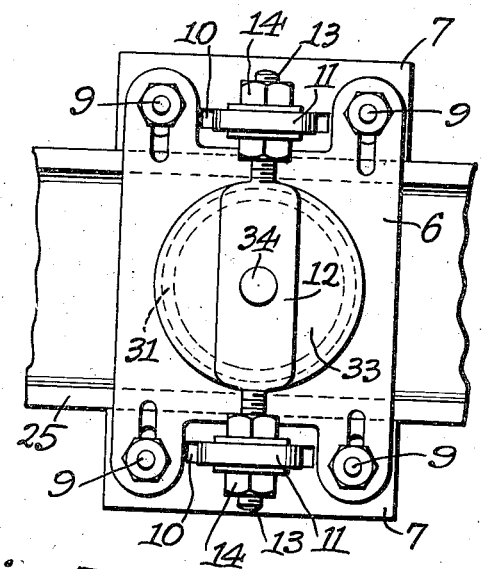
Inventor
L. R. Johnson
By C. A. Snow & Co.
Attorneys.

Patented Aug. 23, 1938

2,127,689

UNITED STATES PATENT OFFICE 2,127,689

TRAILER HITCH

Levi R. Johnson, Worthington, Minn.

Application February 25, 1937, Serial No. 127,729

3 Claims. (Cl. 280—33.9)

This invention relates to a hitching device designed for hitching a power device to a vehicle or craft being towed, the primary object of the invention being to provide a hitching device of the yieldable type, whereby the strain directed to the hitching device, incident to the sudden stopping or starting of the power device, will be equally distributed throughout the hitching device as well as the connecting means, employed in connecting the hitching device and the power device.

An important object of the invention is to provide a hitching device of this character which will allow for restricted universal movement of the power or towing vehicle, with respect to the vehicle or craft being towed, eliminating side sway, as well as vertical swing of the vehicle or craft towed.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a plan view of a hitching device designed primarily for trailer use.

Figure 2 is a sectional view through the hitching device.

Figure 3 is a sectional view through the hitching device taken on line 3—3 of Figure 2.

Figure 4 is a sectional view taken on line 4—4 of Figure 2.

Figure 5 is a sectional view taken on line 5—5 of Figure 2.

Figure 6 is an end elevational view of the hitching device.

Figure 7 is a view illustrating one of the bumper clamping plates, forming a part of the hitching device.

Figure 8 is a view illustrating one of the side bars of the trailer hitch.

Referring to the drawings in detail, the hitching device comprises a bumper clamping member including a rear plate 5 and a forward plate 6, the plates 5 and 6 being held in spaced relation by means of the bars 7, which are formed with elongated openings 8 for the reception of the bolts 9, which pass through the plates 5 and 6, as clearly shown by Figure 2 of the drawings.

These bars 7 are also formed with elongated openings 10 through which the bars 11 operate, the bars 11 being connected at their forward ends, by means of the bar 12, which as shown, is relatively wide, and has its ends reduced and threaded as at 13, the threaded ends 13 of the bar 12, being extended through openings in the bars 11, where they are supplied with nuts 14, securing the bars 11 in position.

The opposite ends of the bars 11, are connected by means of the bolt 15, which has a head 16 at one end, the opposite end of the bolt being threaded to receive the nuts 17, securing the bolt in position.

This bolt 15 provides a support for the split socket member 18, which is formed with an opening to receive the bolt, the socket member 18 being held at a point intermediate the ends of the bolt 15, by means of the coiled springs 19, which are shown as disposed between the bars 11 and socket member 18, holding the socket member in position, but permitting of slight movement of the socket member longitudinally of the bolt 15.

The bars 11 are provided with elongated openings 20, which openings accommodate the reduced ends 21 of the bar 22, the reduced ends of the bar 22 also passing through the transversely extended bars 23 that rest on the bars 11, as clearly shown by Figure 2 of the drawings. Nuts 24 are provided on the reduced ends of the bar 22, and secure the bar 22 in position in such a way that sliding movement of the bar 22, longitudinally of the bars 11, will be permitted.

The plates 5 and 6 are bolted to the bumper, which in the present showing is indicated by the reference character 25, by means of the bolt 26, which bolt also secures the spring seats 27 to the plates 5 and 6. A spring seat 28 is secured to the bar 22, by means of the bolt 29, and accommodates one end of the coiled spring 30, the opposite end of the coiled spring being held withing the spring seat 27. The coiled spring 31 has one of its ends mounted within the spring seat 32, the opposite end thereof being held within the spring seat 33, secured to the bar 12, by means of the bolt 34. Thus it will be seen that due to the construction of the springs 30 and 31, the hitching device is held centralized on the bumper 25, the springs being in position to restrict movement of the hitching device with respect to the bumper.

The reference character 35 designates a clevis, which carries a head 36 fitted in the socket member 18, whereby universal movement of the clevis or hitching device, will be permitted.

It might be further stated that the rear plate 5, is formed with rearwardly extended extensions 37 that engage the lugs 38 carried by the transverse bars 23, the extensions acting to guard the springs and movable bars of the hitching device.

From the foregoing it will be seen that when the device has been secured to the bumper of a vehicle, and the clevis 35 has been secured to a trailer or craft to be towed, sudden forward movement of the towing vehicle, will cause a movement of the springs, compressing the springs and relieving the connection, of undue strain, and at the same time eliminating sudden jar or jolts incident to the sudden starting or stopping of the vehicle, enhancing the riding qualities of the trailer.

Having thus described the invention, what is claimed is:

1. A hitching device of the class described, comprising upper and lower bars, securing means for securing the hitching device to a power device and including plates, bars between the plates and adapted to hold the plates in spaced relation with each other, the latter bars having openings through which the first mentioned bars slide, coiled springs adapted to restrict movement of the first mentioned bars, and means for securing a trailer to the hitching device.

2. A hitching device comprising upper and lower parallel horizontal bars, vertical bars disposed between the horizontal bars and connected thereto, upper and lower transversely disposed bars having openings through which the horizontal bars move, plates connected to the last mentioned bars and adapted to be secured to a bumper, coiled springs between the plates and vertical bars, and means for securing the trailer to the hitching device.

3. A trailer hitching device for motor vehicles, comprising upper and lower parallel bars, vertical bars disposed between the parallel bars, and holding the parallel bars in spaced relation with respect to each other, the first mentioned bars having elongated openings, one of said vertical bars having its ends mounted for sliding movement in the elongated openings, a member adapted to clamp the device to a motor vehicle bumper, said clamping member including spaced plates mounted on the parallel bars and movable with respect thereto, a coiled spring mounted between a vertical bar at one end of the hitching device and the clamping member, a coiled spring between the clamping member and said movable bar, and means for securing the hitching device to a trailer.

LEVI R. JOHNSON.